US012565432B2

(12) United States Patent     (10) Patent No.:   US 12,565,432 B2

Jung et al.     (45) Date of Patent:    Mar. 3, 2026

---

(54) SODIUM HYPOCHLORITE PRODUCTION SYSTEM AND WATER TREATMENT METHOD USING SAME

(71) Applicant: TECHWIN CO., LTD., Cheongju-si (KR)

(72) Inventors: Boong Ik Jung, Cheongju-si (KR); Jung Sik Kim, Sejong-si (KR); Tae Shin Cho, Cheongju-si (KR); Dong Hyuck Choi, Cheongju-si (KR); Tae Woo Kim, Cheongju-si (KR)

(73) Assignee: TECHWIN CO., LTD., Cheongju-si (KR)

( * ) Notice: Subject to any disclaimer, the term of this patent is extended or adjusted under 35 U.S.C. 154(b) by 644 days.

(21) Appl. No.: 18/064,707

(22) Filed: Dec. 12, 2022

(65) Prior Publication Data

US 2023/0114579 A1     Apr. 13, 2023

Related U.S. Application Data

(63) Continuation of application No. PCT/KR2021/007711, filed on Jun. 21, 2021.

(30) Foreign Application Priority Data

Aug. 19, 2020    (KR) ......................... 10-2020-0103859
Oct. 13, 2020    (KR) ......................... 10-2020-0131648

(51) Int. Cl.
    *C02F 1/46*       (2023.01)
    *C02F 1/461*      (2023.01)
           (Continued)

(52) U.S. Cl.
    CPC ........ *C02F 1/4674* (2013.01); *C02F 1/46104* (2013.01); *C02F 2103/08* (2013.01);
           (Continued)

(58) Field of Classification Search
    CPC ................ C02F 1/4674; C02F 1/46104; C02F 2103/08; C02F 2201/46115;
           (Continued)

(56) References Cited

U.S. PATENT DOCUMENTS

| | | | | |
|---|---|---|---|---|
| 6,805,787 B2 * | 10/2004 | Bess | ......................... | C25B 1/26 |
| | | | | 205/474 |
| 6,811,710 B2 * | 11/2004 | Simmons | .................. | F17C 3/10 |
| | | | | 210/756 |
| 2003/0091497 A1 * | 5/2003 | Mason | .................. | C01B 11/024 |
| | | | | 423/478 |

FOREIGN PATENT DOCUMENTS

| | | |
|---|---|---|
| JP | 2000-140851 A | 5/2000 |
| JP | 2004-181445 A | 7/2004 |

(Continued)

OTHER PUBLICATIONS

International Search Report issued in PCT/KR2021/007711; mailed Sep. 24, 2021.

(Continued)

*Primary Examiner* — Waqaas Ali
(74) *Attorney, Agent, or Firm* — Studebaker Brackett PLLC

(57)            ABSTRACT

Provided, according to one aspect of the present invention, are a sodium hypochlorite production system and a water treatment method using same, the sodium hypochlorite production system comprising: a first means for obtaining saturated brine and purified water using a first sub-stream branching off from a main stream of water to be treated; a second means for obtaining an anodic product and cathodic product by electrolyzing the saturated brine and purified water; and a third means for obtaining sodium hypochlorite by reacting the anodic product and cathodic product using a second sub-stream branching off from the main stream of the water to be treated.

9 Claims, 2 Drawing Sheets

(51) Int. Cl.
    *C02F 1/467*         (2023.01)
    *C02F 103/08*       (2006.01)

(52) U.S. Cl.
    CPC ............... *C02F 2201/46115* (2013.01); *C02F*
                               *2201/4618* (2013.01)

(58) Field of Classification Search
    CPC .... C02F 2201/4618; C02F 2201/46185; C02F
                2209/06; C02F 1/66; C02F 2303/14;
                          C25B 1/26; C25B 9/19
    See application file for complete search history.

(56) References Cited

FOREIGN PATENT DOCUMENTS

| | | | |
|---|---|---|---|
| KR | 101079470 B1 * | 11/2011 | ............... C02F 1/50 |
| KR | 10-1226640 B1 | 1/2013 | |
| KR | 10-1373389 B1 | 3/2014 | |
| KR | 10-1446571 B1 | 10/2014 | |

OTHER PUBLICATIONS

Korea Waterworks and Sewerage Association, "Water Supply Facility Standards", 2010, The Ministry of Environment, Korea, pp. 482-485; a translation of Korean Office Action in KR 10-2023-0045201 dated Dec. 4, 2023, as concise explanation of relevance is attached.

* cited by examiner

SODIUM HYPOCHLORITE PRODUCTION SYSTEM AND WATER TREATMENT METHOD USING SAME

CROSS-REFERENCE TO RELATED APPLICATIONS

This application is a continuation of International Patent Application No. PCT/KR2021/007711, filed on Jun. 21, 2021, which claims priority to and the benefit of Korean Patent Application No. 10-2020-0103859, filed on Aug. 19, 2020 and Korean Patent Application No. 10-2020-0131648, filed on Oct. 13, 2020, the disclosure of which is incorporated herein by reference in its entirety.

TECHNICAL FIELD

The present invention relates to a sodium hypochlorite production system and a water treatment method using the same.

BACKGROUND ART

Sodium hypochlorite (NaOCl) is applied to various fields such as treatment of waterworks, sewage and wastewater, seawater electrolysis, ballast water treatment, sterilization and disinfection of agricultural food and food materials.

Such sodium hypochlorite is prepared by using a low-concentration sodium hypochlorite production system and a high-concentration sodium hypochlorite production system depending on concentration of sodium hypochlorite.

Low-concentration sodium hypochlorite having concentration of 0.4 to 1.0% is obtained by passing salt water through a diaphragm-free electrolyzer performing a contact-type electrode reaction. High-concentration sodium hypochlorite having concentration of 2% or more is obtained by reacting chlorine gas and caustic soda, which were generated in a diaphragm-type electrolyzer in which a cathode and an anode are partitioned by a diaphragm, in a reactor.

FIG. 1 illustrates a conventional high-concentration sodium hypochlorite production system. Referring to FIG. 1, the conventional high-concentration sodium hypochlorite production system may include: a raw water treatment device 2 that processes a portion branching off from water to be treated 1 to obtain purified water; and a salt water treatment device 6 that processes a portion of the purified water 3 and saturated salt water 5 prepared from salt stored in a salt tank 4. The remaining portions of purified saturated salt water 7 obtained from the salt water treatment device 6 and the purified water 3 may be respectively transferred to an anode chamber and a cathode chamber constituting an electrolyzer 8.

The electrolyzer 8 is a diaphragm-type electrolyzer, and may include an anode chamber, a cathode chamber, and a diaphragm for partitioning the anode chamber and the cathode chamber. The anode chamber includes an anode water tank 10 for circulating an anode product, and the cathode chamber includes a cathode water tank 14 for circulating an anode product. The anode water tank 10 and the cathode water tank 14 respectively discharge anode water 11 and hydrogen gas 16.

Furthermore, chlorine gas and caustic soda generated in each of the anode chamber and the cathode chamber are moved to a reactor 17 via the anode water tank 10 and the cathode water tank 14 and are reacted in the reactor, thereby generating sodium hypochlorite.

Additionally, the conventional electrolyzer includes a caustic soda tank 18 and an injection device 20 for injecting caustic soda into the reactor 17 and/or a sodium hypochlorite tank 22 to maintain and stably store the generated sodium hypochlorite in pH of 12 or more, and further includes a cooling device 23 for suppressing generation of by-products during storage of sodium hypochlorite.

As described above, the conventional sodium hypochlorite production system has several disadvantages in that anode water discharged from the anode water tank contaminates surrounding environment, and in that it requires lots of maintenance fees due to a complicated configuration of a plurality of facilities, e.g., tanks, pipes, and the likes, for stably storing the manufactured high-concentration sodium hypochlorite. In addition, since chlorine gas, hydrogen gas, caustic soda, and the like generated through electrolysis are dangerous materials designated as harmful chemicals, the conventional electrolyzer may cause accidents, damages, or unnecessary risks in a case in which such harmful chemicals are transferred and circulated through a pipe exposed to the outside.

DISCLOSURE

Technical Problem

Accordingly, the present invention has been made in view of the above-mentioned problems occurring in the related art, and it is an object of the present invention to provide a sodium hypochlorite production system, which is environmentally friendly and is convenient in maintenance and management, and a water treatment method using the same.

Technical Solution

To accomplish the above-mentioned objects, according to the present invention, there is provided a sodium hypochlorite production system including: a first means for obtaining saturated salt water and purified water by using a first sub-stream branching off from a main stream of water to be treated; a second means for electrolyzing the saturated salt water and the purified water to obtain a cathode product and an anode product; and a third means for obtaining sodium hypochlorite by making the cathode product and the anode product react each other by using a second sub-stream branching off from the main stream of the water to be treated.

In an embodiment, the second means comprises an anode chamber including an anode, a cathode chamber including a cathode, and a diaphragm partitioning the anode chamber and the cathode chamber.

In an embodiment, the third means comprises a reactor, but does not comprise a facility to inject caustic soda to the obtained sodium hypochlorite.

In an embodiment, the first sub-stream provides power to transfer the purified water and the saturated salt water to the second means.

In an embodiment, the second sub-stream provides power to transfer the anode product and the cathode product to the third means.

In an embodiment, the sodium hypochlorite production system does not comprise a facility to store the sodium hypochlorite produced in the third means.

In an embodiment, a pH difference between the main stream of the water to be treated and the sodium hypochlorite is 2 or less.

In another aspect of the present invention, there is provided a water treatment method using the sodium hypochlorite production system, the water treatment method comprising the steps of: (a) obtaining saturated salt water and purified water by using a first sub-stream branching off from a main stream of water to be treated; (b) electrolyzing the saturated salt water and the purified water to obtain an anode product and a cathode product; (c) making the anode product and the cathode product react each other by using a second sub-stream branching off from the main stream of the water to be treated to obtain sodium hypochlorite; and (d) injecting the sodium hypochlorite into the main stream without storing the sodium hypochlorite.

In an embodiment, a pH difference between the main stream of the water to be treated and the sodium hypochlorite is 2 or less.

In an embodiment, in step (d), a pH change amount of the main stream of the water to be treated according to injection of the sodium hypochlorite is 2 or less.

Advantageous Effects

The sodium hypochlorite production system according to one aspect of the present invention branches a portion of the water to be treated to act as power required for moving materials in the production system so as to minimize a pH difference between the water to be treated and the sodium hypochlorite, thereby immediately injecting the prepared sodium hypochlorite into the water to be treated without storing the sodium hypochlorite. Accordingly, since there is no need to additionally adjust the pH of the sodium hypochlorite in the production system or the production system does not need additional facility or device for storing the sodium hypochlorite, thereby being convenient in maintenance and management.

In addition, the second means for electrolysis in the sodium hypochlorite production system may include an anode chamber, a cathode chamber, and a diaphragm. As occasion demands, the second means may not include a cathode water tank for circulating the cathode product obtained in the cathode chamber and/or an anode water tank for circulating the anode product obtained in the anode chamber, thereby solving the problem of worsening the surrounding environment due to discharge of anode water containing a great deal of byproducts from the conventional anode water tank.

The effects of the present disclosure are not limited to the above-mentioned effects, and other effects, which are not specifically mentioned herein, will be clearly understood by those skilled in the art from the following description.

MODE FOR INVENTION

Figure 1:
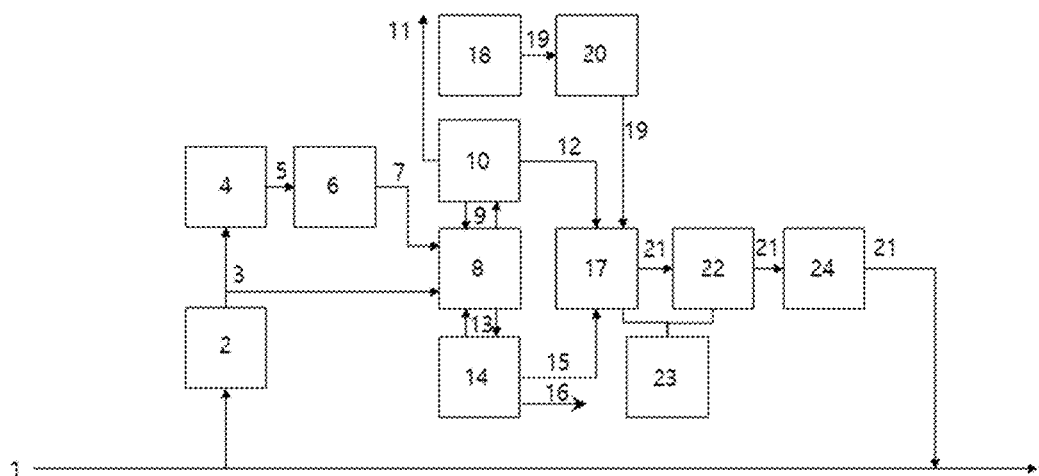
FIG. 1 illustrates a conventional sodium hypochlorite production system.

Hereinafter, the present invention will be described in detail with reference to the accompanying drawings. However, embodiments of the present invention may be implemented in several different forms and are not limited to the embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included.

Sodium Hypochlorite Production System

Figure 2:
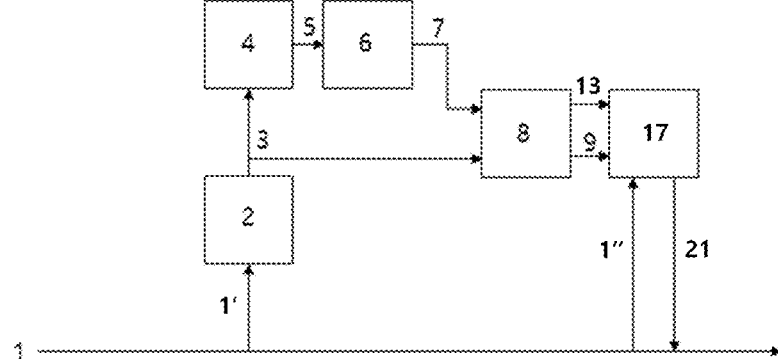
FIG. 2 illustrates a sodium hypochlorite production system according to an embodiment of the present invention.

FIG. 2 illustrates a sodium hypochlorite production system according to an embodiment of the present invention.

Referring to FIG. 2, the sodium hypochlorite production system according to an aspect of the present invention may include: a first means for obtaining saturated salt water and purified water by using a first sub-stream branching off from a main stream of water to be treated; a second means for electrolyzing the saturated salt water and the purified water to obtain a cathode product and an anode product; and a third means for obtaining sodium hypochlorite by making the cathode product and the anode product react each other by using a second sub-stream branching off from the main stream of the water to be treated.

The first means may include: a raw water treatment device 2 that treats a first sub-stream 1' branching off from the main stream 1 of the water to be treated to obtain purified water 3; and a salt water treatment device 6 that treats saturated salt water 5 prepared from a portion of the purified water 3 and salt stored in a salt tank 4.

In this specification, the term "water to be treated" means contaminated water requiring treatment and sterilization by sodium hypochlorite obtained by using the preparation system, and the term "main stream" may refer to a dynamic state of contaminated water being at a predetermined place in a subcurrent state or flowing along a predetermined path. In addition, the term "sub-stream" refers to a dynamic state of contaminated water that a portion of the main stream of water to be treated branches off and flows along a predetermined path.

In a case in which the main stream 1 of the water to be treated refers to the dynamic state of contaminated water flowing along the predetermined path, the first sub-stream 1' branching off from the main stream 1 may be rejoined to the main stream 1 together with sodium hypochlorite 21 through the first to third means constituting the sodium hypochlorite production system.

In addition, the second sub-stream 1" branching off from the main stream 1 may be rejoined to the main stream 1 together with the sodium hypochlorite 21 through the third means.

At least a portion of the first and second sub-streams 1' and 1" may directly participate in reaction between materials in at least one of the first to third means, and in some cases, may act only as an inert carrier for transferring materials without participating in such reaction.

The remaining portion of the purified saturated salt water 7 obtained from the salt water treatment device 6 and the purified water 3 may be transferred to a cathode chamber and a cathode chamber constituting an electrolysis device of a second means, which will be described later.

The second means may be an electrolyzer, preferably, a diaphragm-type electrolysis tank 8. The diaphragm type electrolysis tank may include an anode chamber including an anode, a cathode chamber including a cathode, and a diaphragm partitioning the anode chamber and the cathode chamber.

In the anode chamber, the purified saturated salt water is electrolyzed to generate chlorine gas ($Cl_2$), which is an anode product 13. In the cathode chamber, sodium ions ($Na^+$) transferred through the diaphragm and hydroxyl ions ($OH^-$) generated by electrolysis of water react to each other to generate caustic soda (NaOH) which is a cathode product.

Figure 3:
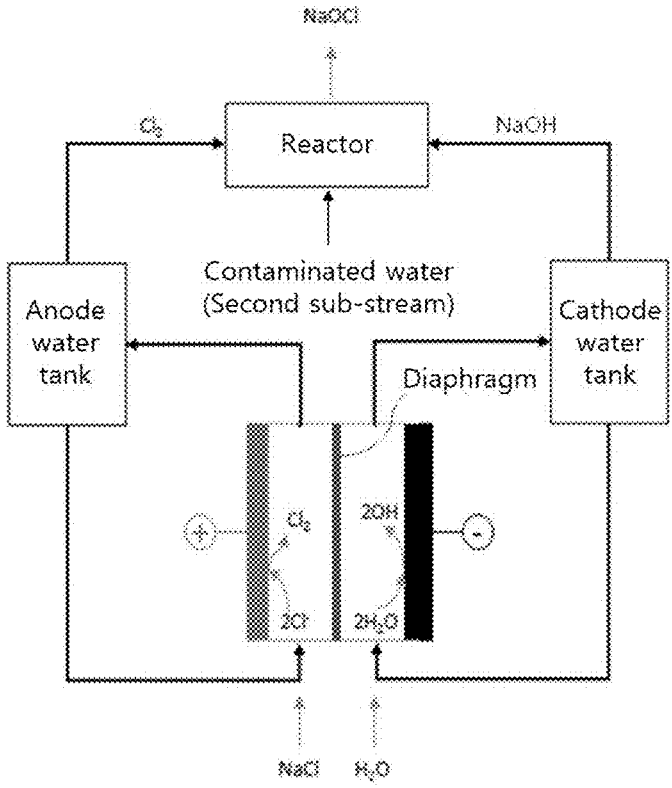
FIGS. 3 and 4 illustrate an electrolyzer and a reactor according to an embodiment of the present invention.

FIG. 3 illustrates an electrolyzer and a reactor according to an embodiment of the present invention. Referring to FIGS. 2 and 3, the sodium hypochlorite production system may include an anode chamber including an anode, a cathode chamber including a cathode, and a second means including a diaphragm partitioning the anode chamber and the cathode chamber, namely, a diaphragm type electrolysis tank 8, and may further include a third means, namely, a reactor 17, for obtaining sodium hypochlorite through reaction of materials generated in the cathode chamber and the anode chamber.

The reactor 17 may be separately provided outside the diaphragm-type electrolysis tank 8. An anode water tank and a cathode water tank may be respectively provided between the anode chamber and the reactor, and between the cathode chamber and the reactor. Anode water stored in the anode water tank may circulate in the anode chamber and the anode water tank, and cathode water stored in the cathode water tank may circulate in the cathode chamber and the cathode water tank.

The anode water tank is a facility to storing anode water circulating in the anode chamber of the diaphragm type electrolyzer, and the cathode water tank is a facility to storing cathode water circulating in the cathode chamber of the diaphragm type electrolyzer.

If necessary, the anode water tank and/or the cathode water tank may include a conductivity sensor and/or a water level sensor. Preferably, the conductivity sensor may be provided on an anode water circulation pipeline and/or a cathode water circulation pipeline, and the water level sensor may be provided in the anode water tank and/or the cathode water tank.

The concentration of the cathode water and/or the anode water may be controlled in a case in which a conductivity valve is opened and closed by the conductivity sensor, and the supply of pure water and the level of anode water and/or cathode water may be control in a case in which a water level valve is opened and closed by the water level sensor. That is, the water level and concentration of the cathode water and/or the anode water may be simultaneously controlled through the conductivity sensor and the water level sensor, thereby adjusting the material balance of the anode water tank and/or the cathode water tank.

However, in order to properly circulate and discharge the materials generated in the anode chamber and the cathode chamber, it requires complicated facilities, such as a storage tank, pipes, etc. Additionally, there is a problem of worsening surrounding environment due to discharge of anode water containing lots of byproducts from the anode water tank.

As described above, the sodium hypochlorite production system having the first to third means may, if necessary, omit facilities provided to properly circulate and discharge the materials generated in the anode chamber and the cathode chamber of the conventional system.

The branched sub-stream of the main stream of the water to be treated may act as a carrier for transferring materials (including raw materials, intermediate products, and final products) in at least one of the first to third means of the sodium hypochlorite production system and/or through the first to third means to provide necessary power. Accordingly, the sodium hypochlorite production system may omit facilities, such as the anode water tank, the cathode water tank, and the circulation line, provided to properly circulate and discharge the materials generated in the anode chamber and the cathode chamber of the conventional system. In this case, the entire system may be made in a compact size to improve productivity and economic feasibility, and may solve the problem due to discharge of anode water so as to raise environmental-friendly performance.

Figure 4:
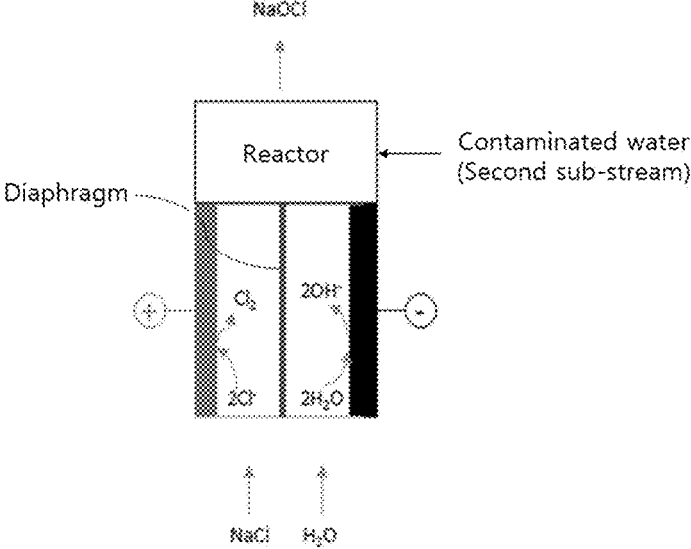

FIG. 4 illustrates an electrolyzer and a reactor according to an embodiment of the present invention. Referring to FIGS. 2 and 4, the reactor 17 of the third means may be configured integrally with the diaphragm type electrolyzer 8 of the second means, so the anode water tank, the cathode water tank, the circulation line, and the like may be properly omitted, but in such a case, the present invention can obtain the same effects as the above.

Chlorine gas and caustic soda generated in the anode chamber and the cathode chamber of the second means may be transferred to the reactor 17 of the third means provided downstream of the second means to react with each other, thereby generating sodium hypochlorite.

The water to be treated may be weak acidic, weakly basic, or neutral, that is, pH of the water to be treated may be about 5 to 9. A portion of the water to be treated may branch off to act as power necessary for moving materials in the production system. Accordingly, pH of the produced sodium hypochlorite may be about 5 to 9.

That is, a difference between the pH of the water to be treated and the pH of the sodium hypochlorite may be 2 or less, preferably 1 or less, more preferably 0.5 or less. In this case, since the pH of the water to be treated and the pH of the sodium hypochlorite are substantially the same, the prepared sodium hypochlorite may be continuously and promptly injected and applied to the water to be treated without being stored.

In addition, in this case, facilities or devices for adjusting or storing pH of the sodium hypochlorite produced in the third means, for instance, the caustic soda tank for injecting caustic soda to the reaction tank 11 and/or the sodium hypochlorite tank for storing the produced sodium hypochlorite, may be omitted. Accordingly, the sodium hypochlorite production system according to the present invention is convenient in maintenance and management.

Water Treatment Method

According to another aspect of the present invention, a water treatment method using the sodium hypochlorite production system includes the steps of: (a) obtaining saturated salt water and purified water by using a first sub-stream branching off from a main stream of water to be treated; (b) electrolyzing the saturated salt water and the purified water to obtain an anode product and a cathode product; (c) making the anode product and the cathode product react each other by using a second sub-stream branching off from the main stream of the water to be treated to obtain sodium hypochlorite; and (d) injecting the sodium hypochlorite into the main stream without storing the sodium hypochlorite.

Since the steps (a) to (c) are characterized by using the first to third means constituting the sodium hypochlorite production system as described above, the configurations and operational effects of the steps are the same as the above.

In step (d), the sodium hypochlorite may be injected to the main stream of the water to be treated without being stored.

The sodium hypochlorite production system may not include facilities for adjusting pH of the obtained sodium hypochlorite to a predetermined range, specifically, facilities for storing the sodium hypochlorite generated in the third means, and/or facilities for injecting caustic soda to the produced sodium hypochlorite.

Instead, at least one sub-stream branching off from the main stream of the water to be treated may be used as power, namely, carrier, necessary for moving materials in the sodium hypochlorite production system to adjust pH of the produced sodium hypochlorite within a predetermined range, for instance, a range similar to pH of the water to be treated. In this case, a pH change amount of the main stream of the water to be treated according to injection of the sodium hypochlorite may be minimized.

Additionally, the water treatment method is convenient in operation, maintenance and management since not needing equipment and a control method for adjusting the pH of the obtained sodium hypochlorite within the predetermined range.

The pH difference between the main stream of water to be treated and the sodium hypochlorite may be 2 or less, preferably 1 or less, and more preferably 0.5 or less. In addition, in step (d), a pH change amount of the main stream of the water to be treated according to the injection of sodium hypochlorite may be 2 or less, preferably 1 or less, and more preferably 0.5 or less.

The above description of the present disclosure is just for illustration, and a person skilled in the art will understand that the present disclosure can be easily modified in different ways without changing essential techniques or features of the present disclosure. Therefore, the above embodiments should be understood as being descriptive, not limitative. For example, any component described as having an integrated form may be implemented in a distributed form, and any component described as having a distributed form may also be implemented in an integrated form.

The scope of the present disclosure is defined by the appended claims, rather than the above description, and ail changes or modifications derived from the meaning, scope and equivalents of the appended claims should be interpreted as falling within the scope of the present disclosure.

EXPLANATION OF REFERENCE NUMERALS

1: Main stream of water to be treated
1': First sub-stream of water to be treated
1": Second sub-stream of water to be treated
2: Raw water treatment device
3: Purified water
4: Salt tank
5: Saturated salt water
6: Salt water treatment device
7: Purified saturated salt water
8: Diaphragm type electrolyzer
9: Anode product
10: Anode water tank
11: Cathode water
12: Chlorine gas
13: Cathode product
14: Cathode water tank
15: Cathode water (caustic soda)
16: Hydrogen gas
17: Reactor
18: Caustic soda tank
19: Caustic soda
20: Caustic soda injection device 21: Sodium hypochlorite
22: Sodium hypochlorite tank
23: Cooling device
24: Sodium hypochlorite injection device

The invention claimed is:

1. A sodium hypochlorite production system comprising:
a raw water treatment device that treats a first sub-stream branching off from a main stream of water to be treated to obtain purified water;
a salt water treatment device that treats saturated salt water prepared from a portion of the purified water and salt stored in a salt tank;
an electrolyzer for electrolyzing the saturated salt water and a remaining portion of the purified water to obtain a cathode product and an anode product; and
a reactor for obtaining sodium hypochlorite by making the cathode product and the anode product react each other by using a second sub-stream branching off from the main stream of the water to be treated,
wherein the sodium hypochlorite production system does not comprise a facility to store the sodium hypochlorite produced in the reactor, and the second sub-stream branching off from the main stream of the water to be treated is not in fluid communication with a facility to store the sodium hypochlorite.

2. The sodium hypochlorite production system according to claim 1, wherein the electrolyzer comprises an anode chamber including an anode, a cathode chamber including a cathode, and a diaphragm partitioning the anode chamber and the cathode chamber.

3. The sodium hypochlorite production system according to claim 1, wherein the reactor does not comprise a facility to inject caustic soda to the obtained sodium hypochlorite.

4. The sodium hypochlorite production system according to claim 1, wherein the first sub-stream provides power to transfer the purified water and the saturated salt water to the electrolyzer.

5. The sodium hypochlorite production system according to claim 1, wherein the second sub-stream provides power to transfer the anode product and the cathode product to the reactor.

6. The sodium hypochlorite production system according to claim 1, wherein a pH difference between the main stream of the water to be treated and the sodium hypochlorite is 2 or less.

7. A water treatment method using the sodium hypochlorite production system according to claim 1, the water treatment method comprising the steps of:
(a) obtaining saturated salt water and purified water by using a first sub-stream branching off from a main stream of water to be treated;
(b) electrolyzing the saturated salt water and the purified water to obtain an anode product and a cathode product;
(c) making the anode product and the cathode product react each other by using a second sub-stream branching off from the main stream of the water to be treated to obtain sodium hypochlorite; and
(d) injecting the sodium hypochlorite into the main stream without storing the sodium hypochlorite.

8. The water treatment method according to claim 7, wherein a pH difference between the main stream of the water to be treated and the sodium hypochlorite is 2 or less.

9. The water treatment method according to claim 7, wherein in step (d), a pH change amount of the main stream of the water to be treated according to injection of the sodium hypochlorite is 2 or less.

* * * * *